United States Patent
D'Urso

(10) Patent No.: US 9,507,828 B2
(45) Date of Patent: *Nov. 29, 2016

(54) METHOD AND APPARATUS FOR INTRANET SEARCHING

(71) Applicant: Microsoft Technology Licensing, LLC, Redmond, WA (US)

(72) Inventor: Mark S. D'Urso, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,309

(22) Filed: Nov. 25, 2013

(65) Prior Publication Data

US 2014/0081947 A1    Mar. 20, 2014

Related U.S. Application Data

(63) Continuation of application No. 10/967,003, filed on Oct. 15, 2004, now Pat. No. 8,595,223.

(51) Int. Cl.
*G06F 7/00* (2006.01)
*G06F 17/30* (2006.01)

(52) U.S. Cl.
CPC ..... *G06F 17/3053* (2013.01); *G06F 17/30864* (2013.01)

(58) Field of Classification Search
CPC ................ G06F 17/30864; G06F 17/3053
USPC .................................... 707/729, 778
See application file for complete search history.

(56) References Cited

U.S. PATENT DOCUMENTS

| | | | |
|---|---|---|---|
| 5,794,237 A | 8/1998 | Gore, Jr. | |
| 5,875,446 A | 2/1999 | Brown et al. | |
| 6,094,649 A | 7/2000 | Bowen et al. | |
| 6,101,503 A | 8/2000 | Cooper et al. | |
| 6,151,595 A | 11/2000 | Pirolli et al. | |
| 6,236,364 B1 * | 5/2001 | Petersson et al. | 342/361 |
| 6,263,364 B1 | 7/2001 | Najork et al. | |
| 6,339,437 B1 * | 1/2002 | Nielsen | G06F 3/04855 |
| | | | 707/E17.082 |
| 6,636,848 B1 | 10/2003 | Aridor et al. | |
| 6,658,402 B1 | 12/2003 | Dutta | |
| 6,681,223 B1 | 1/2004 | Sundaresan | |
| 6,819,339 B1 | 11/2004 | Dowling | |
| 6,982,708 B1 * | 1/2006 | Mah et al. | 345/418 |

(Continued)

FOREIGN PATENT DOCUMENTS

| EP | 0 950 961 A2 | 10/1999 |
|---|---|---|
| JP | 8-305729 A | 11/1996 |

(Continued)

OTHER PUBLICATIONS

Office Action Received for Japanese Patent Application No. 2005-261230, mailed on May 24, 2011, 5 pages of English Translation.

(Continued)

*Primary Examiner* — Van Oberly
(74) *Attorney, Agent, or Firm* — Kevin Sullivan; Kate Drakos; Micky Minhas

(57) ABSTRACT

A method for processing an intranet includes crawling the intranet to identify at least some of the pages in the intranet, and determining, for each identified page, a number of links in a shortest path from a root page to the identified page.

20 Claims, 5 Drawing Sheets

(56) References Cited

U.S. PATENT DOCUMENTS

| | | | |
|---|---|---|---|
| 7,565,630 B1* | 7/2009 | Kamvar | G06F 17/30867 |
| 7,769,752 B1* | 8/2010 | Turner | G06F 17/30713 |
| | | | 707/705 |
| 7,779,012 B2 | 8/2010 | D'Urso | |
| 2001/0029506 A1 | 10/2001 | Lee et al. | |
| 2001/0039657 A1 | 11/2001 | Fopeano et al. | |
| 2002/0069190 A1 | 6/2002 | Geiselhart | |
| 2002/0099700 A1* | 7/2002 | Li | 707/5 |
| 2003/0101415 A1 | 5/2003 | Chang | |
| 2003/0212673 A1 | 11/2003 | Kadayam et al. | |
| 2004/0002849 A1* | 1/2004 | Zhou | G06F 17/27 |
| | | | 704/4 |
| 2004/0024751 A1 | 2/2004 | Petrisor et al. | |
| 2005/0033641 A1 | 2/2005 | Jha et al. | |
| 2005/0262050 A1* | 11/2005 | Fagin et al. | 707/3 |
| 2006/0074903 A1* | 4/2006 | Meyerzon et al. | 707/5 |
| 2006/0085397 A1 | 4/2006 | D'Urso | |

FOREIGN PATENT DOCUMENTS

| | | |
|---|---|---|
| JP | 9-54776 A | 2/1997 |
| JP | 9-218876 A | 8/1997 |
| JP | 2000-29660 A | 1/2000 |
| JP | 2002-259407 A | 9/2002 |
| JP | 2003-186883 A | 7/2003 |
| JP | 2004-514978 A | 5/2004 |
| WO | 02/42862 A2 | 5/2002 |
| WO | 0242862 A2 | 5/2002 |

OTHER PUBLICATIONS

Mukherjea et al.,"Focus+Context Views of World-Wide Web Nodes", C&C Research Laboratories, NEC USA, Inc., San Jose, CA, USA Hypertext 97, Southampton UK 1997 ACM 0-89791-866-5, 10 pages.

Eastman et al."Coverage, Relevance, and Ranking: The Impact of Query Operators on Web Search Engine Results", 2003 ACM, pp. 1046-1048.

European Search Report from European Application No. 05108952.2 dated Jul. 6, 2006, 10 pages.

Yoon, J.P.,"Scheme Extraction for Multimedia XML Document Retrieval", Web Information Systems Engineering, 2000, Proceedings of the First International Conference on Hong Kong, China, Jun. 19-21, 2000, Los Alamitos, CA IEEE Comput. Soc., vol. 2, Jun. 19, 2000, pp. 113-120.

Fagin et al., "Searching the Workplace Web," Proceedings of the Twelfth International Conference on World Wide Web, May 2003, pp. 366-375.

Amitay et al., "The Connectivity Sonar: Detecting Site Functionality by Structural Patterns,"Journal of Digital Information, vol. 4, No. 3, 2003, pp. 11-19.

Zorn et al., "Surfing Corporate Intranets," Institution of Electrical Engineers, vol. 21, Issue 3, May/Jun. 1997, pp. 30.

Crowley, "SageMaker's Vortal: The Future of Information Management," Institution of Electrical Engineers, vol. 23, No. 2, Apr.-May 2000, pp. 37-39.

Non-final office action received in U.S. Appl. No. 10/987,092 dated Sep. 22, 2008, 15 pages.

Non-final office action received in U.S. Appl. No. 10/987,092 dated Aug. 24, 2007, 15 pages.

Non-final office action received in U.S. Appl. No. 10/987,092 dated Aug. 17, 2009, 22 pages.

Final office action received in U.S. Appl. No. 10/987,092 dated Mar. 1, 2010, 23 pages.

Final office action received in U.S. Appl. No. 10/987,092 dated Feb. 24, 2009, 21 pages.

Final office action received in U.S. Appl. No. 10/987,092 dated Feb. 12, 2008, 14 pages.

Office Action Received for India Patent Application No. 2323/DEL/2005, Mail Date: Aug. 29, 2014, 2 Pages.

* cited by examiner

METHOD AND APPARATUS FOR INTRANET SEARCHING

This application is a continuation of allowed U.S. application Ser. No. 10/967,003, entitled "METHOD AND APPARATUS FOR INTRANET SEARCHING," filed on Oct. 15, 2004, which is incorporated by reference herein in its entirety

FIELD OF THE INVENTION

The present invention relates to search engines for intranets.

BACKGROUND OF THE INVENTION

Search engines are often used to locate information of interest in a network, such as the entire Internet, or a more focused search of an enterprise intranet. In response to a user's query, a typical search engine provides a rank-ordered list that includes brief descriptions of the uncovered content, as well as text links to the associated network pages. The rank ordering of the list is typically based on a match between words appearing in the query and words appearing in the content. Typical limitations in present search methodology often cause irrelevant content to be returned in response to a query. In particular, the wealth of available content can impair search engine efficacy since it is difficult to separate irrelevant content from relevant content.

A typical engine selects pages, in part, based on the number of appearances of keywords found in search pages. A page can be assigned a relevance corresponding to the number of incidences of a search term on the page, normalized to the length of the page. Some engines seek to improve search results by giving greater significance to Web pages that are linked by a greater number of other pages, taking the number of links as an indicator of significance.

Most search engines follow the same basic procedure for processing information in a network-based collection of pages. The engine uses crawling and parsing techniques to form an index of terms found in the pages of the network. The index includes data that is used by the search system to process queries and identify relevant pages. After the index is built, queries may be submitted to the search engine. A query represents the user's information request, and is expressed using a query language and syntax defined by the search engine. The search engine processes the query using the index data for the network, and returns a hit-list of objects that the search engine identifies as topically relevant. The user may then select relevant objects from the hit-list for viewing and processing. A user of the engine may also use a page from the hit-list as a starting point for further navigation through the network.

SUMMARY OF THE INVENTION

A search tool, according to some principles of the invention, can organize search results based on whether the results are associated with generic or specific subject matter content. For example, in response to a specific query, pages having related specific content can be returned, while, in response to a generic query, pages having related generic content can be returned. The search tool can involve any or all of crawling-related, parsing-related, and querying-related features.

Accordingly, in one aspect, the invention features a method for processing an intranet including pages, at least one of which is a root page. The processing methodology includes crawling the intranet to identify at least some of the pages in the intranet, and determining, for each identified page, a number of links in a shortest path from a root page to the identified page. A hierarchical level for the identified page can be assigned in response to the determined number of links in the shortest path.

In another aspect, the invention features a method for parsing at least one page of an intranet, where the page includes terms arranged in a hierarchical structure. The method includes parsing the page to identify terms in the page, and determining, for identified terms, one or more specificity-related parameters. The specificity-related parameters can be associated with, for example, the location of the term in the hierarchical structure of the page, and/or with a tag-type associated with the term.

In still another aspect, the invention features a method for processing a query for an intranet. The method includes receiving a query that includes at least one search term, and determining a degree of specificity of the query.

DETAILED DESCRIPTION

Applicant has appreciated that conventional search engines often give unsatisfactory results, due, for example, to the vast number of pages available for search, and due to the often very broad search queries submitted by users. A broad query can lead to the return of many hits that are of little or no use to the searcher. Moreover, relevant hits may be buried deep in a list of search results, so that the searcher has little chance of finding a relevant page in the list.

Applicant has further appreciated that conventional search engines are not well adapted to intranet searches. A user seeking general information often enters generic search terms for a search query. A search engine may then return a lengthy hit list having pages of interest that a user may fail to notice because they are buried deep in the list. Further, the list may include pages that have specific subject matter that is irrelevant to the general information sought.

The term "intranet" is used herein in a broad sense to refer a Web site (also known as a Web presence) or a private network (such as an employees-only intranet, or a customers-only extranet.) Thus, some intranets are accessible by the public, while others have restricted access. An intranet contains a collection of information linked together with navigational tools such that the information is presented as being a set of cohesive information.

Figure 2:
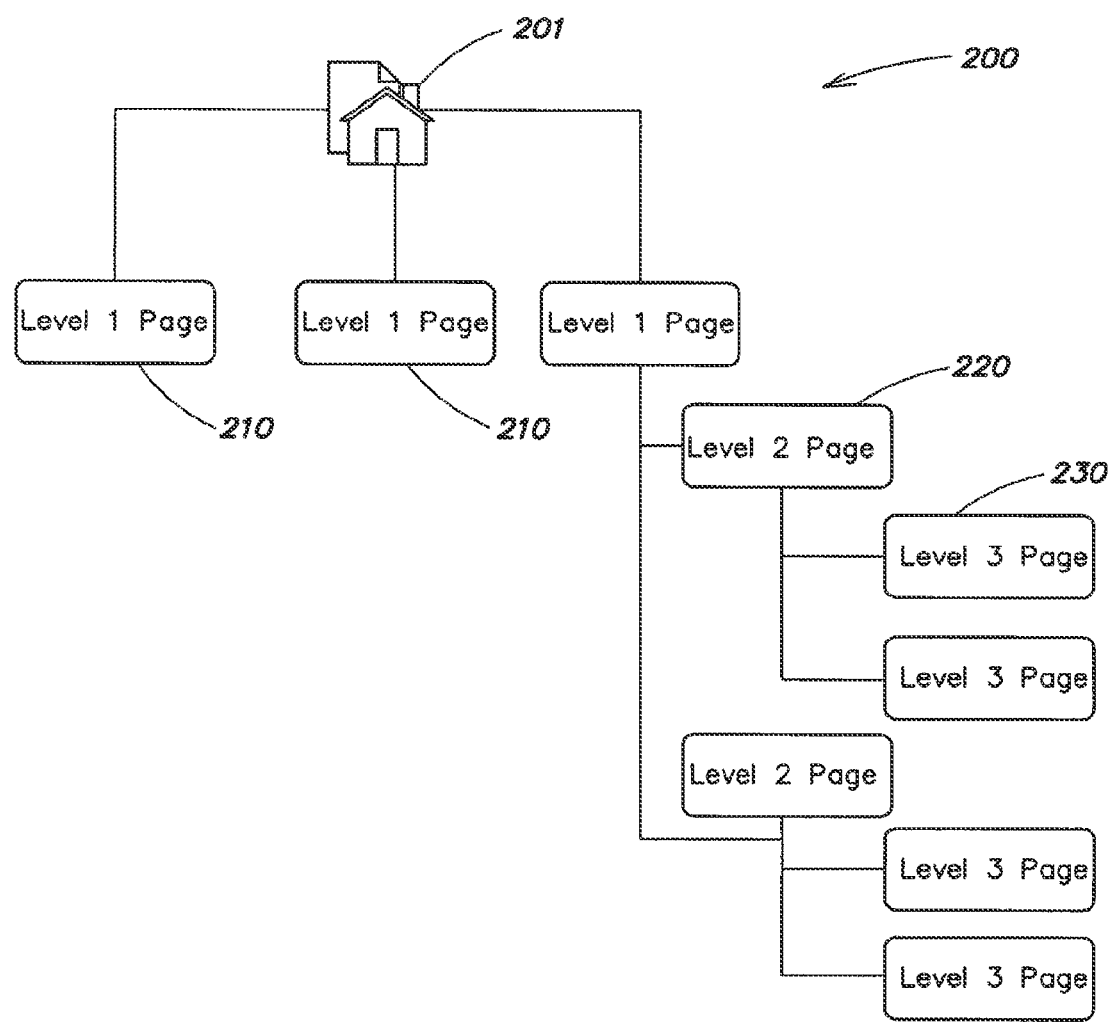
FIG. 2 illustrates a block diagram of a hierarchical organization of an intranet, which can be used to infer the specificity or generality of each page, according to principles of the present invention.

An intranet includes pages, one or more of which are root pages at the top of a hierarchical structure. A root page can be, for example, a home page and/or a conceptual page. An intranet may be controlled by one or more entities, but typically is controlled by, for example, a single company, organization, or individual. An example of the structure of an intranet is illustrated in FIG. 2, which is discussed in more detail below.

Applicant have further appreciated that an intranet typically has a hierarchical structure in which pages are arranged at various levels, with each level being defined by the links needed to reach a page from one or more root pages. The structure can be viewed as a branch-like or root-like structure of a tree, with a root page at the base of the tree (i.e., at the top level of the tree roots, or the bottom level of the tree branches.) Pages at levels of greater distance from the root page typically have narrower and/or more detailed subject matter coverage than pages at levels closer to the root page, which tend to have more generic content. In accordance with one embodiment of the invention, one can influence the results obtained in response to a search queue, depending on whether the search queue seeks generic or specific information, as discussed further below.

A page refers to a file with formatting information that controls its visual layout when presented to a network user via a display as a page. A page has an associated network address. A page may also be referred to, for example as a node or a document. Typically, pages are linked to one or more other pages. A link may be followed by, for example, selecting a term associated with the link. Page content is often formatted through use of hypertext markup language (HTML). The following description utilizes examples of HTML-based pages, but it should be understood that such examples are illustrative and non-limiting, and that features of the invention are applicable to intranets that include pages based on any language, including languages other than HTML.

Figure 4:
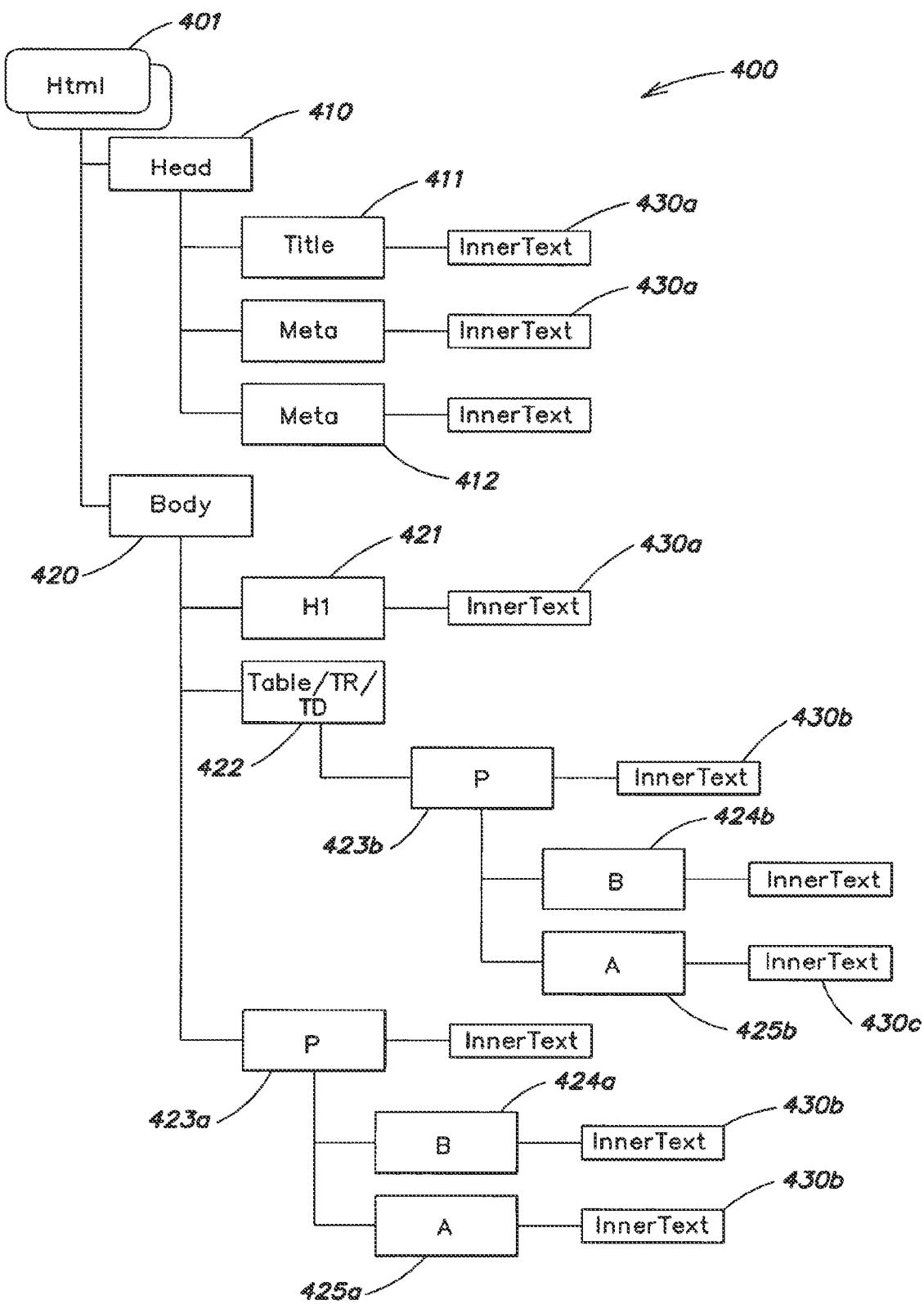
FIG. 4 illustrates a block diagram of a hierarchical organization of a page structure, which can be used to infer the specificity or generality of each term in the page, according to principles of the present invention.

Individual pages can have a structural hierarchy. For example, an HTML-based page can have a node hierarchy associated with, for example, HTML tags including a root tag, and additional tags at various levels relative to the root tag. An example of this structure is shown in FIG. 4, discussed below. Applicant has appreciated that information lower in the hierarchy of a page is typically more specific, and higher in the page is typically more general. In one embodiment, knowledge of the hierarchical location of information is used to influence results returned in response to a generic or a specific search, as described in more detail below.

The expression "conceptual page," is used herein to refer to a page that acts as a primary page or parent for a particular subject matter topic, such that the conceptual page for a topic is at the top of the hierarchy for information specific to the topic. Links extending away from a conceptual page often provide additional information relating to the subject matter topic of the conceptual page, i.e., such pages can act as children to a parent conceptual page.

The word "term" is used herein to refer to a word, phrase, symbol, or other unit of information present in a page. Users of an intranet may search for information of interest in an intranet by, for example, submitting to a search engine a query including one or more terms associated with the information of interest.

The word "weight" is used herein to refer to a level of specificity related to a page or a term. It is also used to refer to a value assigned to a page at the time of a query to determine the placement of the page in a result list returned to a searcher. For example, weight can refer to the degree of specificity assigned to a page based on its hierarchy within an intranet, or to the degree of specificity of a term within a term hierarchy in a page.

Moreover, a page can be assigned specificity values associated with the terms in the page, and thus have different degrees of specificity for each of the different terms located in the page. A page assigned a greater degree of specificity has a higher probability of specific subject matter content than a page assigned a lesser degree of specificity, which has a relatively greater likelihood of general subject matter content.

A specificity can be assigned to a page/term combination, and determined from, for example, the location of the page in an intranet structure and/or the location of a term within the page structure. When page weights are assigned to pages in association with a degree of page relevance, for example, at the time of a query, pages of greater potential relevance can be directed toward, for example, the top of a query response result list.

The invention, in various aspects, arises, in part, from the realization that an intranet search engine can exploit structural features common to intranets to provide search results of improved relevance and/or to reduce the time a user spends locating relevant information. For example, an intranet includes pages linked through a series of page levels at increasing distances from a home page, or a conceptual page. Applicant recognized that more distant pages in an intranet structure tend to include information of greater specificity. That is, Applicant has recognized that intranet authors and designers tend to place more general information in pages at or closer to a root page, and more detailed, topically specific information further from the root page.

Moreover, corporate presence Web site managers, for example, tend to organize a structure of their sites into groups of logical concept areas. These concept areas can also be organized in a manner that places more specific content at a greater distance away from the concept's home page than general content on the same subject. Thus, an intranet can have link structures that tend to be organized into clusters of concepts that are themselves organized, via links, from general to specific.

Thus, near-level pages typically tend to cover broader subject matter at a more generic breadth, while more distant level pages typically tend to provide more narrow, detailed, and specific information about some aspect of the subject matter of a base-, or near-base, level page.

Thus, in one embodiment, according to principles of the invention, the structure of an intranet can be exploited to provide more relevant search results by, for example, crawling pages in the intranet to determine their hierarchical location, and inferring a degree of specificity of the crawled pages based on their hierarchical position. In another embodiment, a degree of specificity of content can be inferred based on structure within a page.

In one embodiment, described below, the information regarding page hierarchy and hierarchy of terms within a page are used together. The invention, however, is not limited in this regard, as either feature can be used either together or alone.

In another embodiment, once information regarding specificity is inferred, a search query can be examined to determine the level of specificity requested, then content having the described level of specificity can be returned.

According to principles of the invention, a search engine, for example, can exploit the above-described structural tendencies to provide more relevant and/or more useful page hits. For example, pages having more specific information can be pushed to the top of a hit list in response to a relatively specific query, and pages having more general information can be pushed to the top of a hit list in response to a relatively broad query. Thus, a user can, for example, more easily and quickly locate pages of interest by spending less time reviewing general subject matter pages when a specific query is made, or inappropriate specific pages when a general query is made.

In contrast, conventional art search engines typically return pages, in response to a query, that include query terms; the pages may be reordered in response to, for example, the number of links directed to a page, which can be taken as an indicator of page importance. Conventional search engines, however, do not utilize features of the structural hierarchy of an intranet, as described herein with respect to the present invention. For example, a conventional search engine can tend to return high level pages having generic subject matter in response to a narrow query, or can return irrelevant deeper level pages having narrow subject matter in response to a broad query.

Thus, according to principles of the invention, a generic query can be used to direct a searcher to portions of an intranet that contain general subject matter related to the query; from these portions, users can often find the information they need via further site navigation down to pages having more specific and relevant subject matter. Conversely, a specific query can be used to direct a searcher to portions of an intranet that contain specific subject matter related to the query.

Figure 1:
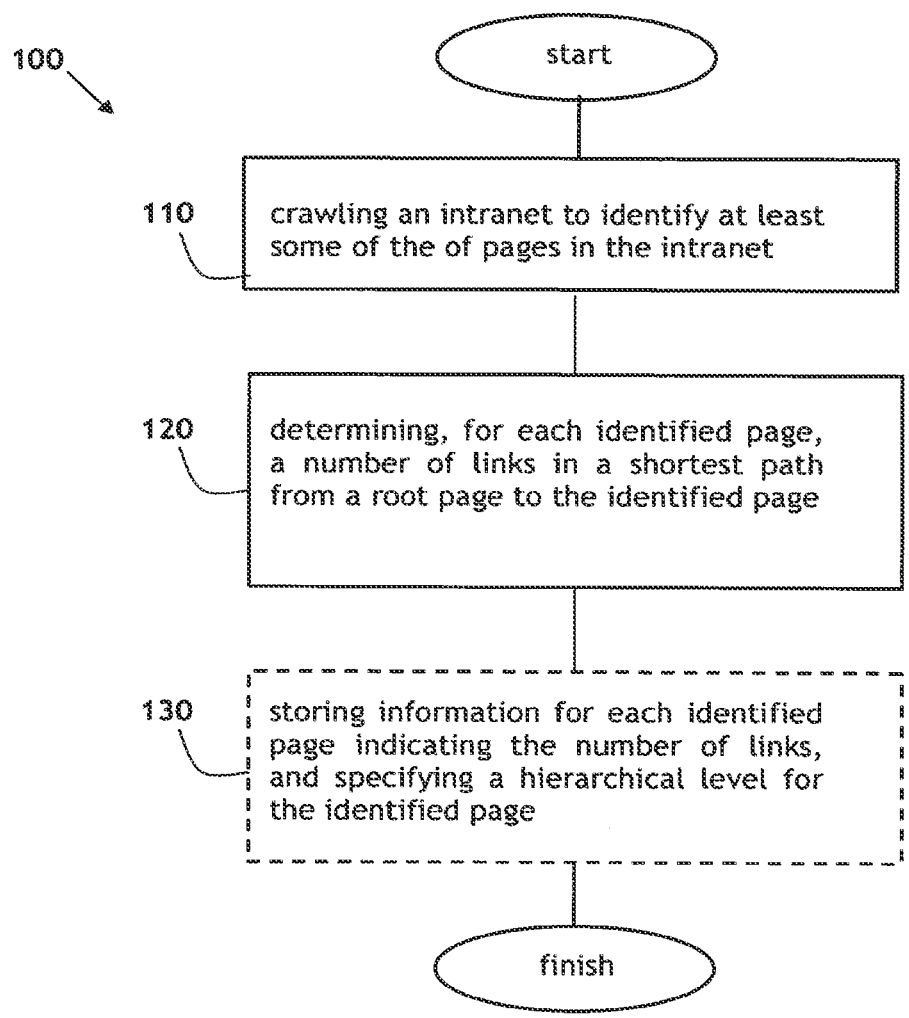
FIG. 1 illustrates a flow diagram of a method for crawling an intranet, in accordance with one embodiment of the present invention.

FIG. 1 is a flow diagram of a method 100 for processing an intranet, according to one embodiment of the invention. The method 100 includes an act of crawling 110 the intranet to identify the pages in the intranet. Crawling 110 can be done in any suitable way, and thus is not limited to any particular techniques. Crawling 110 may identify all of the pages in the intranet, but the invention is not limited in this respect, as processing of every page may not be needed.

The method also includes an act of determining 120, for each identified page, a number of links in a shortest path from a root page to the identified page. The shortest path can be determined in any suitable way. The path can be determined 120 as each page is identified 120. Alternatively, for example, pages can first be identified 110, and then the shortest path can be determined 120.

The method 100 also includes an act of storing 130 information for each identified page indicating the number of links in the shortest path from the at least one root page to the identified page, the information specifying a hierarchical level for the identified page in the intranet. The information can take any form. It can be the links, it can be information that rates specificity according to any scale, or any other suitable way.

Thus, according to the embodiment of the invention of FIG. 1, information about the subject matter content of a page can be inferred from the intranet structure, such as the page hierarchy. For example, an identified page having a shorter path to a root page has a likelihood of being more general in its subject matter than an identified page having a longer path from a root page, which can be assumed to hold relatively narrower, more specific subject matter.

The shortest path is a path of first discovery of an identified page upon crawling from a root page. The shortest path can be determined by beginning a crawl from a root page, and proceeding to a next level of pages via links embedded in the root page. Links embedded in the next level of pages can similarly be followed deeper into the intranet hierarchy. A link to a root page, embedded in a page deeper in the hierarchy, is preferably ignored because all pages in an intranet may include such an embedded link, to enable a user to easily return to a root page, such as a home page of the intranet. Thus, a shortest path will often be a function of links intentionally placed in pages of the intranet.

FIG. 2 is a diagram of an example of an intranet structure 200 that can be processed by the method 100. The structure has a home page 201, first level pages 210 (level 1 of FIG. 2) located one link from the home page, second level pages 220 (level 2 of FIG. 2) located two links from the home page 201, and third level pages 230 (level 3 in FIG. 2) located three links from the home page 210. According to principles of the invention, first level pages 210 are inferred to contain subject matter that is more general than subject matter contained in second level pages 220. Similarly, second level pages 220 are inferred to contain subject matter that is more general than subject matter contained in third level pages 230, and so on.

Figure 3:
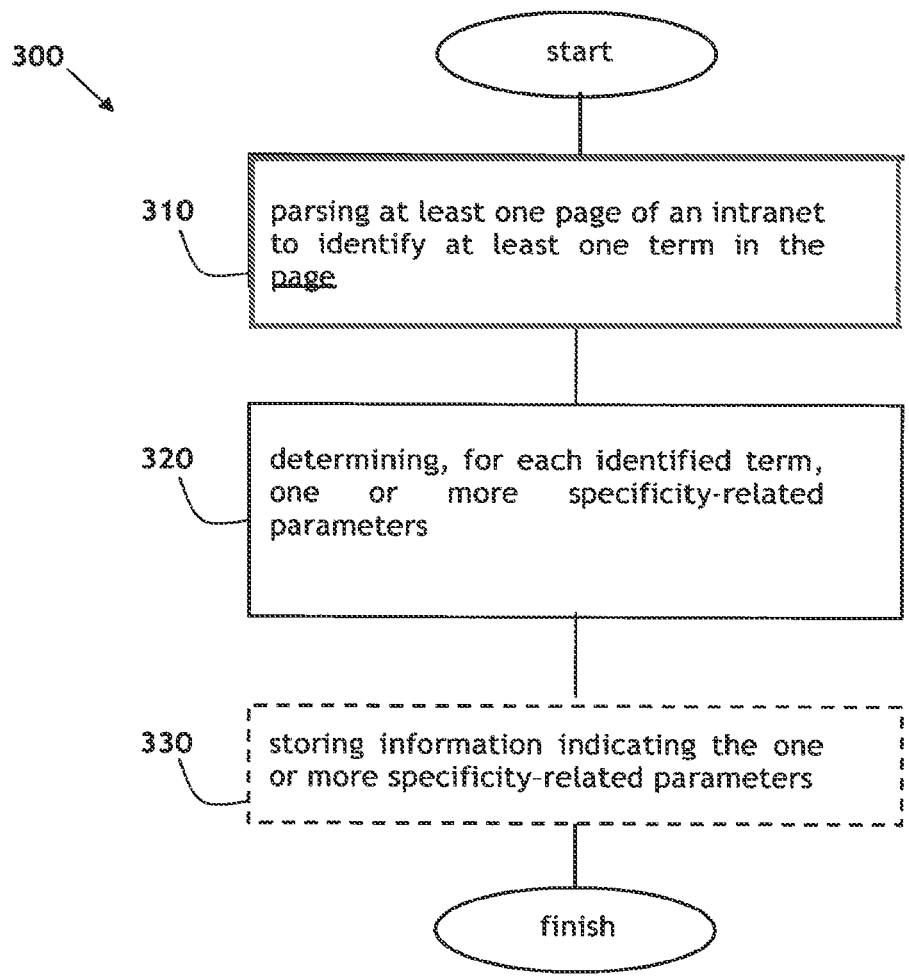
FIG. 3 illustrates a flow diagram of a method for parsing an intranet, in accordance with one embodiment of the present invention.

FIG. 3 illustrates is a flow diagram of a method 300 of parsing pages to glean additional information about content specificity based on the location and/or treatment of the terms within a hierarchy defined by an internal structure of a page. The method 300 includes the acts of parsing 310 at least one page to identify at least one term in the page, and determining 320, for each identified term, one or more specificity-related parameters associated with a term specificity. Such parameters include, for example, a page structure parameter and a tag-type parameter. A page structure parameter can be, for example, a distance from a root of the page.

The method 300 can include an act of storing 330 information, for each identified term, indicating the specificity-related parameter, such as the distance from the root. The information can thus specify a hierarchical level for the identified term in the page. Information specifying a hierarchical level for the identified term in the page can take any form. It can be the levels from a root of a page, it can be information that rates specificity according to any scale, or any other suitable way.

In accordance with one embodiment of the invention, term specificity can be inferred, at lease in part, from the location of the term in an internal page structure. For example, an HTML page has a node hierarchy, as illustrated with reference to FIG. 4. Although the following description relates to HTML pages, embodiments of the invention can be applied to intranet pages having other formats.

The HTML page hierarchy includes HTML tags, which in turn are typically associated with inner text. In accordance with one embodiment, these node hierarchies can be used to infer general versus specific content in a page. For example, the closer the node containing the current inner text is to a page's root, the greater the likelihood that the inner text contains general content that is not specifically focused on a specific topic. Conversely, the further the node is located from the root, the greater the likelihood that the inner text of the node is specific to a particular topic.

Moreover, Applicant has appreciated that formatting aspects, such as bolding of a term, underlining of a term, and/or linking of a term, can indicate a greater level of significance of the term in association with greater specificity, and also results in the text being located further from the root of the page.

The above-described page-level structural information can be used to infer, for example, the weight that a page should have for a given term contained in the document. Thus, for example, a page can be assigned a greater level of specificity for terms in the page identified as associated with a greater level of specificity than other terms in the page.

In one embodiment of the invention, term weights for a page are normalized against the term weights for the same term in other pages based on page length. This normalization helps to prevent long pages from appearing to be more specific than short pages; i.e., a page having greater length will tend to include more appearances of a term. Normalization, when used, can be performed in any suitable way.

FIG. 4 is a diagram of an example of an HTML-based page structure 400. A page associated with the structure 400 could be located, for example, in an intranet having the structure 200 of FIG. 2, and could be processed by the method 300 described with reference to FIG. 3. The structure 400 includes a root tag 401, a page heading tag 410, a page title tag 411, heading meta tags 412, a body tag 420 identifying the body portion of the page 400, a body heading tag 421, a body table tag 422, body paragraph tags 423a, 423b, bold font tags 424a, 424b, and anchor tags 425a, 425b. Some of the tags have associated inner text 430a, 430b, 430c, which can be seen by a user when the page is displayed. These tag-types and their association with inner text are known in the HTML arts.

As discussed above, in some embodiments of the invention, terms in the page structure 400 that are more distant from the root tag 401 can be identified as corresponding to information of greater specificity. For example, the root tag 410 can be associated with level 0, the page heading tag 410 and the body tag 420 can be associated with level 1, the page title tag 411, heading meta tags 412, body heading tag 421, body table tag 422, and body paragraph tag 423a can be associated with level 2, and the body paragraph tag 423b can be associated with level 3.

Moreover, a term that has additional formatting can be associated with a greater level of specificity. Additional formatting indicative of specificity can include, for example, a bold or other distinguishing font or color, a hypertext link, and/or presence in a title or meta tag. Accordingly, terms can be associated with deeper levels of a page hierarchical structure in correspondence to their additional formatting, if any.

Additional tag types can be indicative of a deeper level in a page hierarchy. Such tag types include, but are not limited to, code tags. Term specificity can then be associated with term depth in the hierarchy of the page. Further, term specificity can be weighted according to tag type, as described in more detail below. Thus, a specificity calculation can be improved by utilizing an indication of specificity level provided by a tag type.

Preferably, inner text is assigned a level in the page hierarchy in association with its immediate node level. That is, a node can include inner text, and children also having inner text. The inner text of the children is thus preferably viewed as residing at a different level of the hierarchy in comparison to the inner text immediately associated with the parent node.

As mentioned above, information regarding the specificity or generality of content in a page can be inferred based both upon the position of the page in an intranet hierarchy, as well as information controlling the position of the content in the structure of a page. These two bases of information regarding the specificity/generality of content can be combined in any suitable way, and an embodiment of the invention that employs both is not limited to any particular technique. Below, a specific example is described that employs the two sources of information, but this is merely an example, as determination of the specificity/generality of content can be done in other ways.

Crawling 110 (see FIG. 2) to identify pages can be accomplished, for example, by use of any suitable crawling technique, as described above, and is not limited to known techniques. For example, the intranet can be crawled via use of software robots, spiders, wanderers, worms, etc. to identify pages. According to principles of the invention, information about the determined 120 number of links in a shortest path to an identified page is retained. Crawling can commence, for example, from a root page and/or from conceptual pages of the intranet, which can be identified for the crawler in any suitable way.

Using techniques such as those described above, the acts of crawling 110 and determining 120 can be used to gather link information to determine the location of a page in an intranet structure. For example, crawling 110 can provide a parameter, DL, identifying the page level for each identified page within the intranet. The parameter DL can be specified in any suitable way. For example, DL is conveniently identified as the distance of a particular page from the root page in units of levels, where the root page is at level 0, and each successive level extending away from the root page is incremented by 1 relative to a previous level.

In this example, in addition to page levels determined during crawling 110, nesting levels of terms within pages are determined for terms during parsing of identified pages, as may be accomplished via use of the method 300. According to some principles of the invention, combining information regarding page position within an intranet hierarchy and content position within a page can be implemented through the use of formulae, examples of which are described next.

In this example, the following formulae relate to assigning term hierarchy within associated pages. A normalized term hierarchy for a term in an identified page is defined as follows:

$$NLW = NL - TTL,$$

where NLW is a normalized term level, or specificity, associated with a term in a particular page. NL is the raw term level of the term within the hierarchy of the particular page, as can be measured from a root tag of the page.

TTL is a threshold term level that defines a normalized minimum nesting level of the term for all pages of the intranet that include the term. The TTL has a constant value for a term for all pages identified that include the term. For example, the TTL can be conveniently selected by first determining the maximum nesting level of a term in all pages that include the term in an intranet. TTL can then be set at a level some distance from the maximum term level. For example, if the maximum nesting level for a term is level 10, TTL for the term can be set to level 5. The NLW parameter will then eliminate pages having the term at a nesting level no deeper than level 5.

Alternatively, for example, TTL can be selected based on statistical considerations. For example, TTL can be set at a level two standard deviations above the maximum term level.

In whatever manner TTL is selected, the effect of the TTL parameter is to eliminate, for a term, pages that include the term only at high hierarchy levels with the page. The TTL parameter in effect chops noise from a list of pages including a term by eliminating pages that, though including the term, do not have a sufficient specificity to warrant presentation to a searcher in a result list.

To further refine the specificity associated with a term, a term specificity parameter, TW, for a term in a page, can be determined by adding the NLW parameter to a tag weight parameter, TagW, as follows:

$$TW=TagW+NLW,$$

where TW is a term specificity associated with an overall specificity assigned to a term, for a particular page, and TagW is a tag specificity parameter ascribed to the term based on a term's immediate parent's HTML tag type. To accomplish this, tag types can be assigned constant values defined across an intranet for each tag type. For example, a weight of 1 can be assigned to the most common tag types across the intranet, while greater weights can be assigned to other tag types depending on their relative obscurity. For example, a tag having a weight of 2 can be half as frequent as a tag having a weight of 1. Also, for example, tags in a page head can be treated differently than tags in the page body. For example, tags in the head can be given a tunable weight. That is, any suitable procedure an be utilized to assign a specificity level to the various tag types.

For example, a tag can be assigned a value in part through statistical analysis, and in part through human selection. For example, tags can have a value of 1 to 20, with greater values associated with greater specificity. A statistical analysis can, for example, yield the frequency of tag use, with greater frequency indicating greater generality.

The above-described activities can be used to produce a term index of pages in the intranet. The term index can include a listing of pages that contain a particular term, and a specificity value for the term for each page, such as the TW parameter described above. Moreover, in some embodiments of the invention, an inverted keyword index, as known to those having ordinary skill in the search arts, can be created for searching at query time. An inverted keyword index can be searched to obtain a listing of pages that include search terms.

In some embodiments, an overall term specificity parameter (for example, the NTW parameter described below) is utilized, which is defined for a page relating to all appearances of a particular term in the page. A normalized overall term specificity parameter, NTW, is defined as follows:

$$NTW=\log(STW/ASTW).$$

STW is a sum of all the term specificity (TW) values for all appearances of a term in a particular page. ASTW is an average of all STW parameter values for a term for all pages in which the term appears across the entire intranet. The ratio of STW to ASTW provides a raw normalized overall term specificity, while NTW is a normalized overall term specificity for a term in a page. NTW is expressed in terms of a log for convenience; the base of the logarithm can be base 10 or another value. Use of the logarithm limits the range of NTW values, which is convenient for calculational purposes.

The above-described example formulae can be used, for example, to assist a response to a search engine query, as described with reference to FIG. 5.

Figure 5:
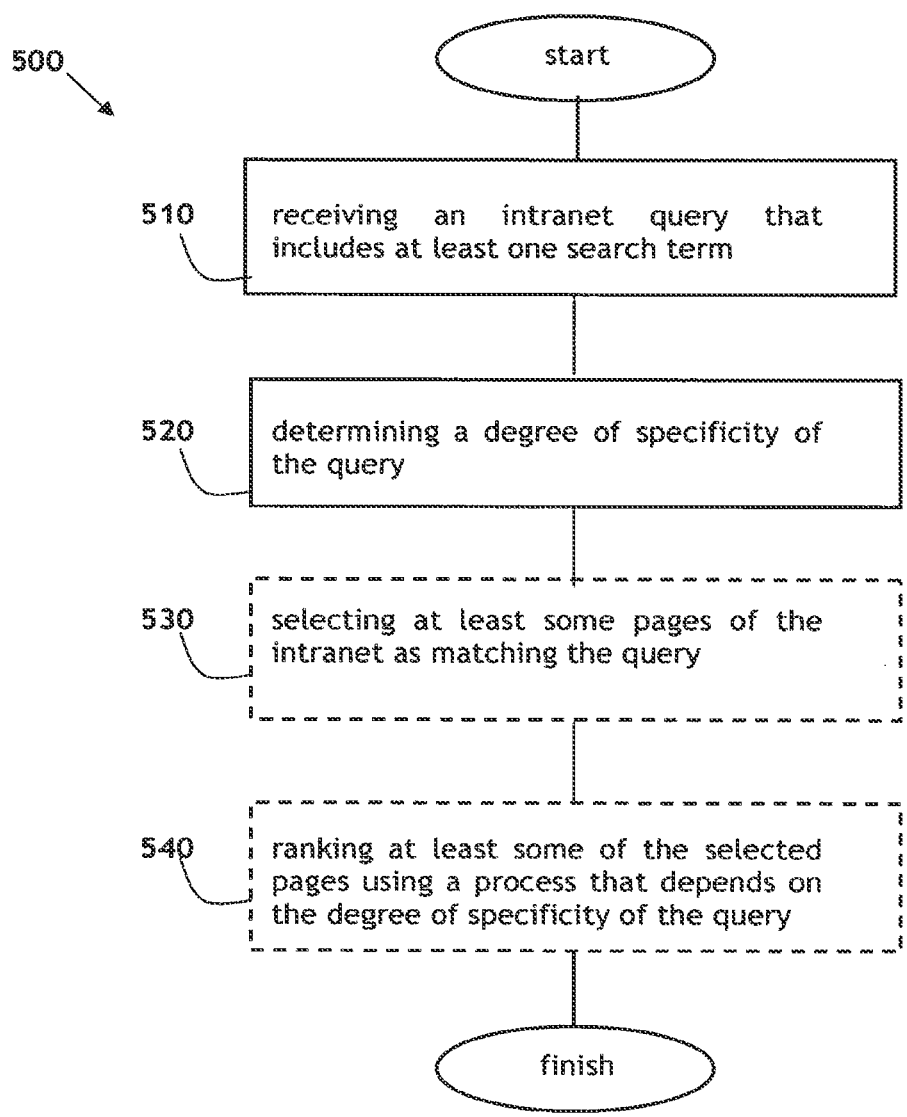
FIG. 5 illustrates a flowchart of a method for processing a search engine query, in accordance with one embodiment of the present invention.

Referring next to FIG. 5, features of the invention can be exploited, for example, to improve the response of a search engine to a user query. FIG. 5 is a flow diagram of a method 500 for processing a search engine query for an intranet, according to one embodiment of the invention. The method 500 includes receiving the query 510, where the query includes at least one search term, and determining 520 a degree of specificity of the query.

The act of determining 520 can be done in any suitable way. In one embodiment, the specificity is determined in an inverse relationship to a potential number of pages returned in response to the query. The number of pages can be the number of pages that include any term found in a query. For example, a query that explicitly requires any of several search terms to appear in a returned page would provide such a potential number of pages. Alternatively, the number of pages can be the number of pages that include, for example, all of the search terms. Such a potential number of pages can be obtained if a query explicitly requires all search terms to reside in a page, or if this requirement is a default when no preference is provided.

The method 500 can include selecting 530 at least some pages of the intranet as matching the query. Selecting 530 can utilize a selection process that depends, at least in part, on the degree of specificity of the query. The method 500 can also include ranking 540 at least some selected pages for presentation in response to the query. Ranking 540 can utilize a ranking process that depends, at least in part, on the degree of specificity of the query.

Ranking 540 can entail ranking pages according to a level of page specificity correlated with the level of specificity of the query. Thus, if a query is perceived as specific, a presented ranking can give preference to pages having specific content. If a query is perceived as generic, or general, the ranking can give preference to pages having generic, or general, subject matter content.

For example, pages can be ranked in a sorted order, in one implementation of the method 500, by assigning a relevance value, R, to each selected page. For example, selected pages can be those that best match all terms in a query. The R value assigned to each such page can then determine a sort order of the selected pages for presentation to a searcher.

In one illustrative set of formulae for calculating page relevance values, R is defined as:

$$R=\log(r), \text{ where}$$

$$NDL=IDL-TDL, \text{ and}$$

$$r=\text{sum of}((twK*NTW)+(nlK*NDL)).$$

The parameters in these formulae have the following definitions.

NDL is a normalized page level for each of the pages that will be returned in response to a particular query. The NDL parameter provides a connection between the search results and the specificity of selected pages. The selected pages, as described below, can be further weighted according to the term parameters described above to further refine the result list presented to a searcher.

IDL is a reverse page level, corresponding to the distance of a particular page from a page at the maximum identified depth of all page levels across the intranet; each successive level away from the maximum depth level is determined by decrementing by 1 from the prior page level. Thus, IDL is similar to the page level parameter, DL, determined during parsing 110, as described above, with, however, the page level measured from the level of the maximum depth of all identified pages of the intranet rather than from the root page.

TDL, a threshold page level, is a minimum page level at which subject matter content is assumed to be significant. The value of TDL is selected in response to the specificity of a particular query, which itself is determined by a number of page hits in response to the query. The TDL can be determined empirically. For example, a range of TDL values can be assigned to a range of numbers of page hits. For example, if a maximum page level is 10, a particular specificity of a particular query can be assigned a TDL value of 5. In this example, calculation of NDL would serve to eliminate all pages in a hit list having page levels of less than 5.

Thus, TDL can be dependent on the specificity of a query. Thus, for example, a deeper TDL can be selected for a more specific query since a page level further from a root is likely to be more relevant for a more specific query. When TDL is subtracted from the IDL parameter, pages that have a negative NDL parameter value are dropped. Thus, pages that remain in a list of pages that include the query terms are those having a specificity greater than a level selected by the action of the TDL parameter.

R is the relevance assigned to a page selected in response to a query. R controls the sort order of a list of pages returned from a search in response to a particular query. R is calculated as a log of a raw relevance value (see r, below) to limit the range of R values to reside from 0 to 1. Limiting the range of values can be convenient for computational purposes. Moreover, the calculated values can be truncated to use, for example, only four digits, to further limit the computational requirements imposed by a search.

r is the raw relevance of each page selected in response to a query, and is the sum of the normalized overall term specificity (NTW) parameter, adjusted by a term weight coefficient (twK, see below), and the normalized page level (NDL), adjusted by a page weight coefficient (nlK, see below). Thus, the raw relevance provides a ranking of page hits correlated to both a page specificity parameter and a term-within-a-page specificity parameter.

twK is a term level coefficient, which is used, with the page level coefficient (see nlk,) to balance the effect given to the normalized overall term specificity (NTW) with the effect given to the normalized page level (NDL) in the calculation of the raw relevance, r. nlK is a page level coefficient. twK and nlK are selected to obtain a desired balance between the use of term specificity and page specificity in a relevance determination.

This balance can be chosen in any suitable manner. twK and nlk can be constants for all queries, or can be adjusted for different queries. twK and nlk can selected, at least in part, to adjust the units of the value of NTW, which is in term level values, and the units of the value of NDL, which is in page level values.

These constants can be assigned values of, for example, 0, 1, 2, or higher to vary the relative weights given to term specificity and page level in a relevance calculation. The values can be selected in any suitable manner. For example, a sample user group can be presented with search results generated with different assigned constant values, and the user group can then identify which set of results is most satisfactory. Thus, for example, constant values can be selected via a subjective, empirical approach.

As described above, in one embodiment, the generality of the search term or terms of a query is a function of the number of pages in a potential result list. For example, a query including the word "windows" on the Microsoft.com Web site will match hundreds of thousands of pages and, in accordance with one embodiment of the invention, is treated as a relatively general search term for that site. Understanding that the term "windows" is a generic query can enable a search engine, according to principles of the invention, to push up generic results in the results set of pages, i.e., pages having broad subject matter will be pushed to the top of a results list presented to the user of the search engine.

In contrast, a query having relatively few page hits can be deemed relatively specific. In response, page hits at a greater distance from a root page can be given a greater weight to push them towards the top of a results list. General content pages associated with lesser specificity values, as may exist near the root page, similarly can be pushed away from the top of a list. A searcher can then be directed to pages having a greater specificity of relevance to a search, to thus increase the speed and/or likelihood of a successful search.

For example, through the above-described processes, pages having a longer path can be given a greater weight in response to a specific query, while pages having a shorter path can be given a greater weight in response to a general query. Thus, a general query can receive, for example, a list of pages with general pages pushed toward the top of the list, while a specific query can receive a list of pages with specific pages pushed toward the top of the list.

The user presenting the general query thus need not sort through many pages having narrow undesired information. This user can start with general subject matter pages, which can be more likely to lead a user to pages having the desired information. Similarly, the user presenting the specific query can avoid examination of pages having information that is too general to satisfy the specific search.

It should be appreciated that some features of the methods 100, 300 outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. In particular, each of the top-level activities may include any of a variety of sub-activities. For example, the top-level activities described herein may include one or any combination of sub-activities described herein or may include other sub-activities that refine the hierarchical structure of instructing and administering a patch management process.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having,"

"containing", "involving", and variations thereof herein, is meant to encompass the items listed thereafter and equivalents thereof as well as additional items.

In an embodiment, a method for processing an intranet comprising a plurality of pages including at least one root page comprises the acts of: (A) crawling the intranet to identify at least some of the plurality of pages in the intranet; and (B) determining, for at least one identified page, a number of links in a shortest path from the at least one root page to the identified page.

In an embodiment, the method may further include an act of: (C) storing information for the at least one identified page indicating the number of links in the shortest path from the at least one root page to the identified page, the information specifying a hierarchical level for the identified page in the intranet.

In an embodiment, the method may further include an act (D) of defining a subject matter specificity level for the identified page in correlation to the hierarchical level of the identified page.

In an embodiment, the subject matter specificity level has a greater valve for an identified page having a greater number of links in its shortest path from the at least one root page relative to a value for an identified page having a fewer number of links in its shortest path from the at least one root page.

In an embodiment, the method may further include an act (C) of selecting a plurality of conceptual pages to be a plurality of root pages.

In an embodiment, the act (C) comprises crawling the intranet by beginning a plurality of crawls through the intranet starting from each of the plurality of root pages.

In an embodiment, the act (A) comprises an act of identifying all of the plurality of pages in the intranet.

In an embodiment, at least one of the plurality of pages comprises HTML formatting.

In an embodiment, the intranet is associated with a Web site.

In an embodiment, the method may further include an act (C) of determining a reverse page level associated with the number of links in the shortest path for each identified page.

In an embodiment, the method may further include an act (D) excluding pages of the identified pages having a shortest path with a number of links less than a threshold number of links.

In an embodiment, the method may further include an act (C) of parsing each page of the plurality of pages to identify any terms in the page.

In an embodiment, the method may further include an act (D) of determining, for each identified term, a distance from a root node of the page.

In an embodiment, the method may further include an act (E) of storing information, for each identified term, indicating the distance from the root, the information specifying a hierarchical level for the identified term in the page.

In an embodiment, the method may further include an act of (C) determining a specificity of a query, the specificity of the query having an inverse relationship to a potential number of pages returned in response to the query.

In an embodiment, the method may further include an act (D) of returning, in response to the query, pages of the identified pages having a level of specificity associated with the level of specificity of the query.

In an embodiment, the act (D) comprises listing the returned pages in an order correlated to the level of specificity of the returned pages.

What is claimed is:

1. A method for processing a query of a network comprising a plurality of pages, each of the plurality of pages being arranged in a hierarchy of terms having at least one root, and, for each one of the terms in each of the plurality of pages, a term specificity is recognized based on a location of the one of the terms in the hierarchy of terms, with terms closer to the at least one root being considered to be more generic, the method comprising:
   operating at least one processor to perform:
      receiving the query from a user, wherein the query comprises at least one search term;
      automatically determining a value indicative of a degree of specificity of the query based on at least one search term of the query, said determining including determining a value proportional to a number of the plurality of pages that include terms that match the at least one search term; and
      selecting pages matching the query, said selecting comprising comparing, for each of the plurality of pages having terms matching the at least one search term of the query, the value indicative of the degree of specificity of the query to a value indicative of a degree of specificity of the page, at least some of the plurality of pages that match the query being selected using a selection process that favors pages comprising matched terms having a term specificity similar to the degree of specificity of the query determined by said automatically determining.

2. The method of claim 1, wherein the plurality of pages arranged in the hierarchy has at least one root, and, for each one of the plurality of pages, the degree of specificity of the page being based on a location of the one of the plurality of pages arranged in the hierarchy, with pages closer to the at least one root being considered to be more generic; and said selecting comprises:
   selecting at least some of the plurality of pages as matching the query using a selection process that favors pages having a degree of specificity similar to the degree of specificity of the query determined by said automatically determining.

3. The method of claim 2, wherein the selection process favors pages having a degree of specificity similar to the degree of specificity of the query determined in said automatically determining by ranking the selected pages based on closeness in matching the degree of specificity of the query determined by said automatically determining.

4. The method of claim 2, wherein the selection process favors pages having a degree of specificity similar to the degree of specificity of the query determined in said automatically determining by selecting pages for inclusion among the selected pages based on closeness in matching the degree of specificity of the query determined by said automatically determining.

5. The method of claim 1, wherein said selecting comprises:
   ranking at least some of the selected pages for presentation in response to the query based on a ranking process that depends, at least in part, on the degree of specificity of the query determined by said automatically determining.

6. The method of claim 1, wherein said automatically determining comprises determining the degree of specificity of the query to be inversely related to a number of the plurality of pages that include terms that match the query.

7. The method of claim 6, wherein said selecting pages matching the query further comprises:

selecting at least some of the plurality of pages as matching the query by selecting at least some of the plurality of pages in association with the degree of specificity of the query, the degree of specificity of the query being inversely related to the number of the plurality of pages that include terms that match the query, and deselecting at least some of the selected pages by favoring selected pages comprising matched terms having a term specificity that are similar to the degree of specificity of the query.

8. The method of claim 1, wherein the at least one search term specifies at least one subject that is the target of the query, and said automatically determining comprises:
determining a degree of specificity of the query with respect to the at least one subject.

9. The method of claim 1, wherein said selecting further comprises:
selecting at least some of the plurality of pages as matching the query by selecting at least some of the plurality of pages in association with the degree of specificity of the query, the degree of specificity of the query being based on the number of the plurality of pages that include terms that match the at least one search term, and deselecting at least some of the selected pages by favoring selected pages having a page specificity that are similar to the degree of specificity of the query.

10. The method of claim 1, wherein:
said comparing comprises, for each of the plurality of pages having terms matching the at least one search term of the query, comparing the value indicative of the degree of specificity of the query to a value in an index being indicative of a degree of specificity of the page; and
said selecting comprises:
based on the comparison, in response to a query having a value indicative of a lesser degree of specificity, favoring pages having values in the index indicative of a lesser degree of specificity, and in response to a query having a value indicative of a greater degree of specificity, favoring pages having values in the index indicative of a greater degree of specificity.

11. The method of claim 1, wherein said automatically determining a value indicative of a degree of specificity of the query is performed before selecting pages matching the query in said selecting to present to the user.

12. The method of claim 1, wherein terms in each of the plurality of pages are associated with formatting characteristics comprising at least one tag type from the group of tag types comprising a distinguishing font, a distinguishing color, a hypertext link, a title, a coding tag, and a meta tag.

13. A method for processing a query of a network comprising a plurality of pages arranged in a hierarchy, the plurality of pages arranged in the hierarchy having at least one root, and for each one of the plurality of pages, a page specificity is recognized based on a location of the one of the plurality of pages in the hierarchy, with pages closer to the at least one root being considered to be more generic, each of the plurality of pages comprising at least one content term, the method comprising:
operating at least one processor to perform:
receiving the query from a user, wherein the query comprises at least one search term;
automatically determining a value indicative of a degree of specificity of the query based on at least one search term of the query; and
selecting pages matching the query, the selecting comprising comparing the value indicative of the degree of specificity of the query to values in an index, the values in the index being indicative of a degree of specificity of pages having terms matching the at least one search term of the query, the selecting comprises, in response to a query having a value indicative of a lesser degree of specificity, favoring pages having values in the index indicative of a lesser degree of specificity, and in response to a query having a value indicative of a greater degree of specificity, favoring pages having values in the index indicative of a greater degree of specificity, at least some of the plurality of pages that match the query being selected using a selection process that favors pages having a page specificity similar to the degree of specificity of the query determined by said automatically determining.

14. The method of claim 13, wherein the selection process favors pages having a page specificity similar to the degree of specificity of the query determined by said automatically determining by ranking the selected pages based on closeness in matching the degree of specificity of the query determined by said automatically determining.

15. The method of claim 13, wherein said automatically determining comprises:
ranking at least some of the selected pages for presentation in response to the query based on a ranking process that depends, at least in part, on the degree of specificity of the query determined by said automatically determining.

16. The method of claim 13, wherein said automatically determining comprises:
determining a number of the plurality of pages that include content terms that match the at least one search term, and the value indicative of a degree of specificity of the query is proportional to the number of the plurality of pages that include content terms that match the at least one search term.

17. The method of claim 13, wherein said automatically determining comprises:
determining the degree of specificity of the query to be inversely related to a number of the plurality of pages that include content terms that match the query.

18. The method of claim 13, wherein terms in each of the plurality of pages are associated with formatting characteristics comprising at least one tag type from the group of tag types comprising a distinguishing font, a distinguishing color, a hypertext link, a title, a coding tag, and a meta tag;
the method further comprises, for each one of the terms in each of the plurality of pages, computing a term specificity based on a specificity weight factor of a tag type associated with the term; and
said automatically determining comprises selecting at least some of the plurality of pages as matching the query using a selection process that favors pages comprising matched terms having a term specificity that are similar to the degree of specificity of the query determined by said automatically determining.

19. A method for processing a query of a network comprising a plurality of pages, each of the plurality of pages comprising at least one content term, the method comprising:
operating at least one processor to perform:
(A) receiving the query from a user, the query comprising at least one search term;
(B) automatically computing a value representing a degree of specificity of the query based on at least one search term of the query, said computing comprising determining a value proportional to a number of the plurality of pages that include content terms that match the at least one search term;

(C) selecting pages matching the query;

(D) determining for each selected page a specificity of one or more terms within the page, the one or more page terms identified based on the query;

(E) computing, for each selected page, a value representing a degree of specificity of the page based on the specificity of the one or more page terms;

(F) comparing the value representing the specificity of the query to the values representing the specificity of the selected pages; and (G) presenting to a user as a result of a search based on the query one or more of the selected pages, the presentation of the one or more of the selected pages being based on said comparing, wherein said presenting comprises:

when the value representing the degree of specificity of the query indicates a specific query, ordering the result of the search from more specific to less specific; and when the value representing the degree of specificity of the query indicates a generic query, ordering the result of the search from less specific to more specific.

20. The method of claim 19, wherein the at least one content term in each of the plurality of pages is associated with formatting characteristics comprising at least one tag type from the group of tag types comprising a distinguishing font, a distinguishing color, a hypertext link, a title, a coding tag, and a meta tag.

\* \* \* \* \*